(12) United States Patent
Hoshikawa et al.

(10) Patent No.: US 7,715,614 B2
(45) Date of Patent: May 11, 2010

(54) METHOD AND DEVICE FOR PRODUCING COMPONENT DATA

(75) Inventors: Kazumi Hoshikawa, Toyohashi (JP); Toru Takahama, Toyohashi (JP)

(73) Assignee: Fuji Machine Mfg. Co., Ltd., Chiryu-shi (JP)

( * ) Notice: Subject to any disclaimer, the term of this patent is extended or adjusted under 35 U.S.C. 154(b) by 897 days.

(21) Appl. No.: 11/207,186

(22) Filed: Aug. 19, 2005

(65) Prior Publication Data

US 2006/0041775 A1 Feb. 23, 2006

(30) Foreign Application Priority Data

Aug. 23, 2004 (JP) .............................. 2004-241829

(51) Int. Cl.
*G06K 9/00* (2006.01)
(52) U.S. Cl. ............................. 382/141; 714/1; 382/149
(58) Field of Classification Search ................. 382/149, 382/141; 714/1, 2
See application file for complete search history.

(56) References Cited

U.S. PATENT DOCUMENTS

| | | | | |
|---|---|---|---|---|
| 5,911,001 A * | 6/1999 | Kawada | .................. | 382/141 |
| 6,286,202 B1 * | 9/2001 | Asai et al. | .................. | 29/740 |
| 6,597,806 B1 * | 7/2003 | Kawada | .................. | 382/151 |
| 6,640,002 B1 * | 10/2003 | Kawada | .................. | 382/141 |
| 6,661,931 B1 * | 12/2003 | Kawada | .................. | 382/276 |
| 6,754,398 B1 * | 6/2004 | Yamada | .................. | 382/260 |
| 6,765,666 B1 * | 7/2004 | Guest et al. | .................. | 356/237.4 |
| 6,839,470 B2 * | 1/2005 | Ikeda | .................. | 382/266 |
| 7,016,064 B2 * | 3/2006 | Iida et al. | .................. | 358/1.15 |
| 7,206,443 B1 * | 4/2007 | Duvdevani et al. | .................. | 382/149 |
| 7,539,340 B2 * | 5/2009 | Kochi et al. | .................. | 382/154 |
| 2002/0001401 A1 * | 1/2002 | Bocionek | .................. | 382/128 |
| 2002/0019751 A1 * | 2/2002 | Rothschild et al. | .................. | 705/3 |
| 2002/0035783 A1 * | 3/2002 | Kawada | .................. | 29/833 |
| 2004/0146190 A1 * | 7/2004 | Kasai | .................. | 382/128 |
| 2007/0160401 A1 * | 7/2007 | Abe et al. | .................. | 400/62 |

FOREIGN PATENT DOCUMENTS

| | | |
|---|---|---|
| JP | 63-201876 A | 8/1988 |
| JP | 05-298417 A | 11/1993 |
| JP | 06-089341 A | 3/1994 |
| JP | 07-271755 A | 10/1995 |
| JP | 08-236990 A | 9/1996 |
| JP | 11-135999 A | 5/1999 |
| JP | 2003-163495 A | 6/2003 |

* cited by examiner

*Primary Examiner*—Daniel G Mariam
*Assistant Examiner*—Aklilu k Woldemariam
(74) *Attorney, Agent, or Firm*—Foley & Lardner LLP

(57) ABSTRACT

A method of producing component data for use with an electronic component mounting apparatus includes imaging a component whose component data is to be produced and displaying a component image on a display, the component image on the display having an outline having at least one side edge with two corners, inputting the corners as reference points so that a first reference line passing the reference points is produced, producing second and third reference lines passing the reference points respectively so as to be perpendicular to the first reference line, inputting a point on another side edge of the outline of the component image and producing a fourth reference line passing the point on the side edge so as to be parallel to the first reference line, and producing component data by measuring a size of the component image outline on the basis of the first to fourth reference lines.

8 Claims, 3 Drawing Sheets

METHOD AND DEVICE FOR PRODUCING COMPONENT DATA

BACKGROUND OF THE INVENTION

1. Field of the Invention

The present invention relates to a method and device for producing component data used with an electronic component mounting apparatus.

2. Description of the Related Art

JP-A-H08-236990 discloses a conventional technique for producing component data used with electronic component mounting apparatus. In the disclosed technique, a component whose component data is to be produced is photographed by a camera. An image of the component obtained is displayed on a display. A first measuring position pointer is set at any point of an edge of the component image on a screen. Subsequently, a second measuring position pointer is set at any point of another edge of the component image on the screen. A spacing between the first and second pointers (a length on the screen) is automatically computed so that the length of the component is measured. Component data is produced from the results of computation.

Generally, a component image picked up by a camera is not necessarily positioned with respect to horizontal and vertical directions (XY direction) and accordingly is sometimes inclined. However, the above-noted conventional technique has no function of automatically determining whether the component image is inclined. Accordingly, even when a component image is inclined, component data is produced on the basis of the inclined component image. As a result, precise component data cannot be produced.

In view of the problem, it is proposed to add to the above-noted technique a function of manually correcting an inclination of the component image while the operator is viewing a screen of the display. However, it is troublesome for the operator to manually correct the inclination of the component image correctly while he or she is viewing the screen, whereupon the working efficiency is low.

SUMMARY OF THE INVENTION

Therefore, an object of the present invention is to provide a component data producing method and device which can efficiently produce precise component data by an exceedingly simple operation, irrespective of an inclination of the component image and a degree of inclination.

In one embodiment, the present invention provides a method of producing component data for use with an electronic component mounting apparatus, comprising a process of imaging a component whose component data is to be produced, by an imaging unit and displaying a component image on a display, the component image on the display having an outline further having at least one side edge with two corners, a process of inputting the corners as referenced points by an operator so that a first reference line passing the reference points is produced, a process of producing second and third reference lines passing the reference points respectively so as to be perpendicular to the first reference line, a process of inputting a point on another side edge of the outline of the component image by the operator and producing a fourth reference line passing the point on said another side edge so as to be parallel to the first reference line, and a process of producing component data by measuring a size of the outline of the component image on the basis of the first to fourth reference lines.

In the above-described method, even in the case where the component image displayed on the screen of the display is inclined, the outline of the component image can be encompassed by four reference lines readily and precisely when the operator inputs three points on the outline of the component image. Consequently, precise component data can efficiently be produced by an exceedingly simple operation, irrespective of an inclination of the component image and a degree of inclination.

In another embodiment, the method further comprises a process of automatically calculating an inclination of a rectangle defined by the first to fourth reference lines and coordinates of a center of the rectangle and a process of producing a cross line (XY coordinates) having the center of the rectangle as an origin thereof, the cross line (XY coordinates) having an inclination equal to the inclination of the rectangle. Consequently, the origin of the cross line (XY coordinates) need not be positioned and no adjustment of inclination is necessitated.

In further another embodiment, the method further comprises a process of turning the component image, the first to fourth reference lines and the cross line together on a screen of the display by an angle equal to the inclination of the rectangle so that the inclinations of the component image, first to fourth reference lines and cross line are rendered zero, and a process of moving the component image toward a center of a screen of the display together with the first to fourth reference lines and the cross line so that a center of the component image corresponds with the center of the screen of the display. Consequently, the component image can be positioned on a central part of the screen of the display together with the reference lines and the cross line precisely both horizontal and vertical directions. Moreover, since the component image is displayed on the central part of the display screen, a larger image can be displayed by an effective use of the screen when the component image is scaled up. Consequently, the component image is easy for the operator to view.

The cross line may or may not be displayed and furthermore, the reference lines may or may not be displayed. When the cross line and reference lines are not displayed, the operator inputs two corners of one side edge of the outline of the component image as the first and second reference points respectively and a point on another side edge of the outline of the component image as the third reference point. As a result, the size of the outline (the rectangle) and the inclination of the component image are determined from the positions of the three reference points. Accordingly, the size of the outline and the inclination of the component image may automatically be calculated so that the component data is produced.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 6:
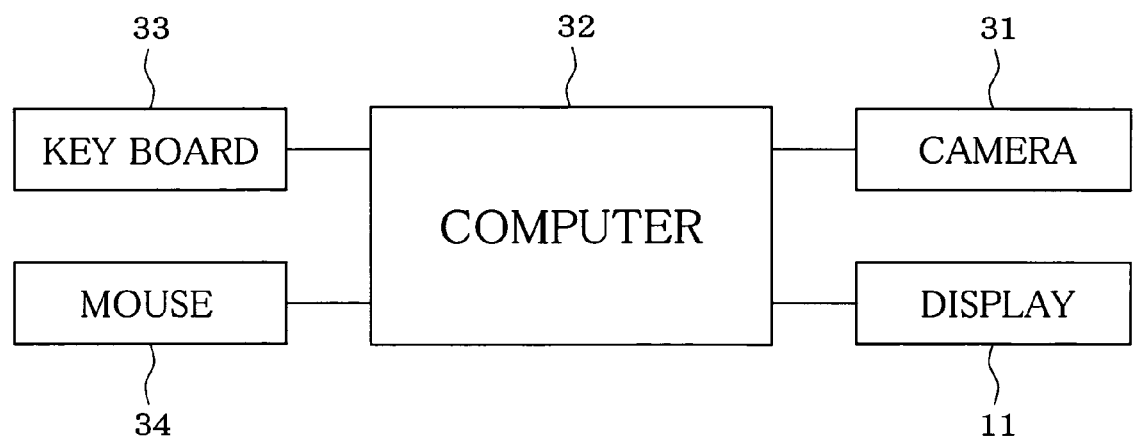
FIG. 6 is a schematic block diagram showing an arrangement of the component data producing device.

One embodiment of the present invention will be described with reference to the accompanying drawings. Referring first to FIG. 6, the component data producing device comprises a camera 31 (an imaging unit) which images a component whose component data is to be produced, a display 11, such as a liquid-crystal display or a cathode-ray tube (CRT), which displays an image of the component imaged by the camera 31, a computer 32 (component data producing unit) which encompasses an outline of a component image 10 with four reference lines 12 to 15 on the screen of the display 11 and produces component data, input unit such as a key board 33 and a mouse 34 which are connected to the computer 32.

Figure 1:
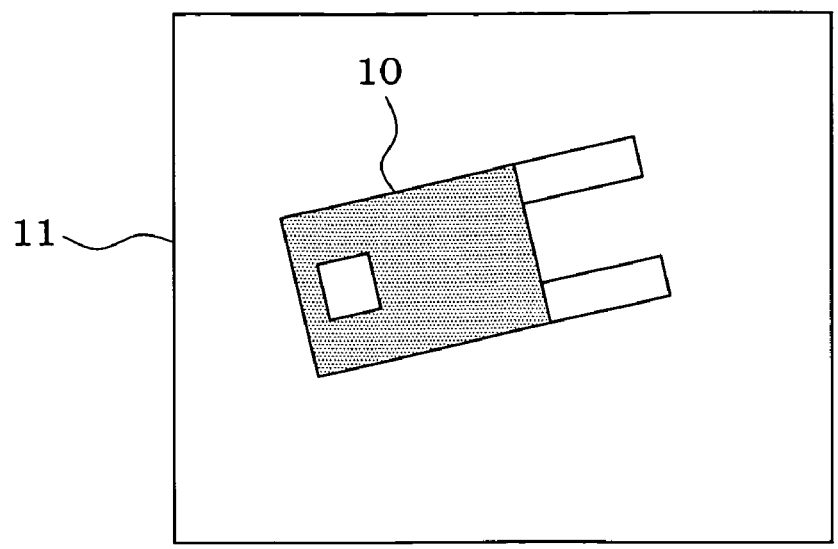
FIG. 1 shows a component image displayed on a screen of a display employed in one embodiment of the component data producing device in accordance with the present invention.

When component data is produced using the aforesaid component data producing device, firstly, a component whose component data is to be produced is imaged by the camera 31, and an obtained image of the component is displayed on a screen of the display 11, as shown in FIG. 1. In this case, there is no problem when the whole component image 10 is displayed within the screen of the display 11. The component image 10 may be decentered on the screen of the display 11 or may be inclined. Alternatively, image data of the component previously imaged by the camera 31 may be stored on a memory device (not shown) so that the stored image data is read out into the computer 32 thereby to be displayed on the display 11.

Figure 2:
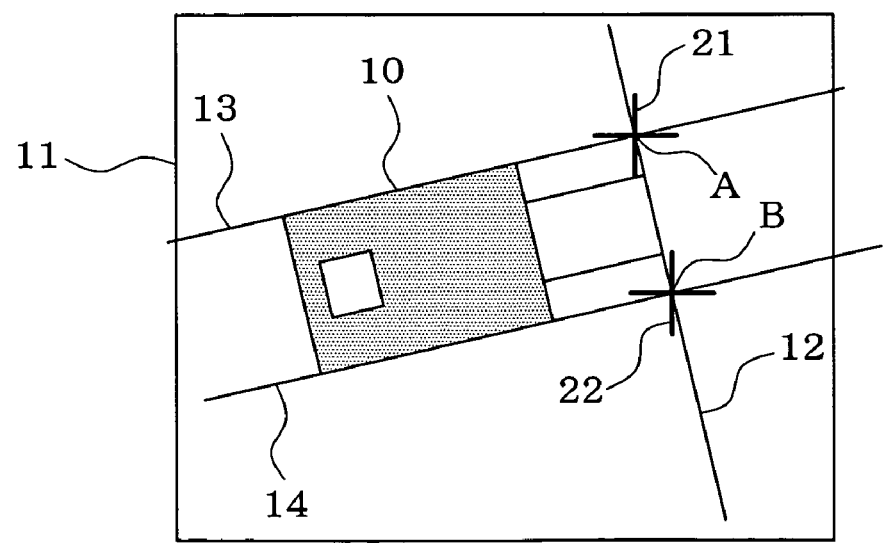
FIG. 2 explains a manner of producing first to third reference lines.

Subsequently, as shown in FIG. 2, an operator operates an input unit such as a mouse 34 to cause two indication pointers 21 and 22 to correspond with two corners of one side edge of an outline of the component image 10 on the screen of the display 11, thereby inputting reference points A and B, respectively. Upon input of the reference points A and B, the computer 32 computes or otherwise calculates a reference line 12 passing both reference points A and B, causing the display 11 to display the obtained reference line 12 on the screen. The computer 32 further carries out computation to obtain second and third reference lines 13 and 14 which pass the respective reference points A and B and are perpendicular to the first reference line 12. The obtained reference lines 13 and 14 are also displayed on the screen of the display 11.

Figure 3:
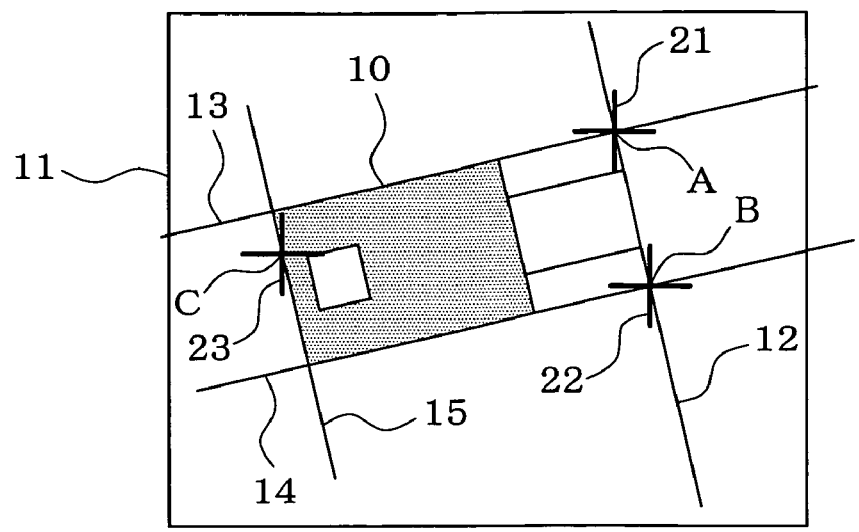
FIG. 3 explains a manner of producing a fourth reference line.

Subsequently, as shown in FIG. 3, the operator operates the input unit such as the mouse 34 to cause a third indication pointer 23 to correspond with an optional point C of another side edge of the outline of the component image 10 on the screen of the display 11, thereby inputting the reference point C. Upon input of the reference point C, the computer 32 computes a fourth reference line 15 which passes the point C and is parallel to the reference line 12. The obtained fourth line 15 is displayed on the screen of the display 11.

Figure 4:
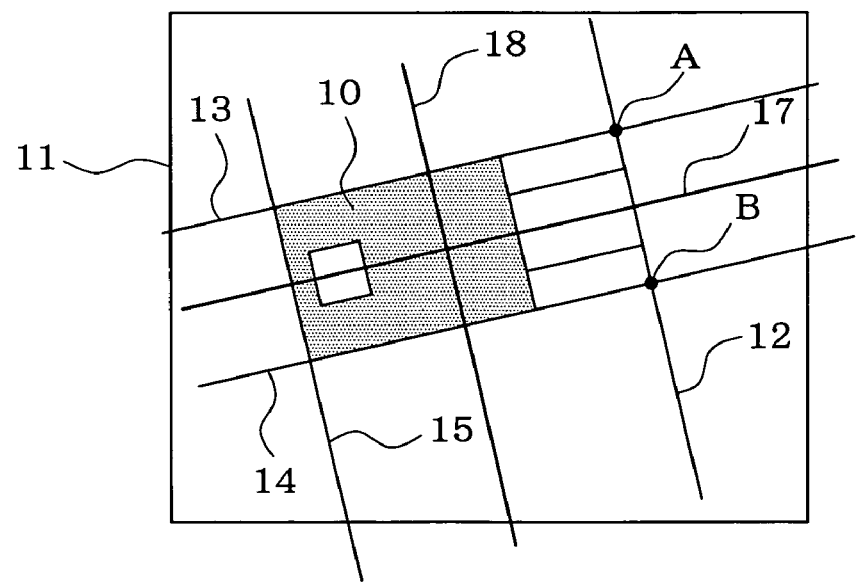
FIG. 4 explains a manner of producing a cross line.

Subsequently, the computer 32 automatically carriers out the first to fourth reference lines 12 to 15 and coordinates of center of the rectangle. The computer 32 then produces a cross rectangle as a respective origins, as shown in FIG. 4. The cross lines 17 and 18 further have respective inclination equal to the inclination of the rectangle.

Figure 5:
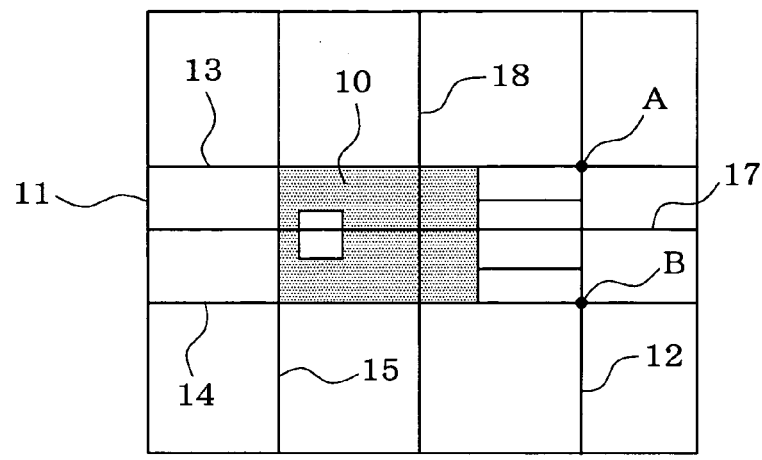
FIG. 5 shows a final display state.

Subsequently, as shown in FIG. 5, the computer 32 turns, on the screen of the display 11, the component image 10, the first to fourth reference lines 12 to 15 and the cross lines 17 and 18 together by an angle equal to the inclination of the rectangle so that inclinations of the component image 10, reference lines 12 to 15 and cross lines 17 and 18 are rendered zero. Furthermore, the computer 32 moves the component image 10 together with the first to fourth reference lines 12 to 15 and the cross lines 17 and 18 so that a center of the component image 10 automatically corresponds with a center of the screen of the display 11.

Subsequently, the computer 32 measures dimensions of the component image 10 on the basis of the reference lines 12 to 15 and the cross lines 17 and 18 to produce component data, storing the produced component data on a memory.

In the foregoing embodiment, the operator operates the input unit to input two corners of one side edge of the outline of the component image 10 as the reference points A and B respectively. Upon input of the reference points A and B, the computer 32 produces the first reference line 12 passing the two reference points A and B. The computer 32 further produces the second and third reference lines 13 and 14 which pass the respective reference points A and B and are perpendicular to the first reference line 12. Furthermore, the operator inputs the optional point C on another side edge of the outline of the component image 10. Upon input of the point C, the computer 32 produces the fourth reference line 15 which passes the point C and is parallel to the first reference line 12. Accordingly, even in the case where the component image 10 displayed on the screen of the display 11 is inclined, the outline of the component image 10 can be encompassed by the four reference lines 12 to 15 readily and precisely when the operator inputs three points A, B and C on the outline of the component image 10. Consequently, precise component data can efficiently be produced by an exceedingly simple operation, irrespective of an inclination of the component image 10 and a degree of inclination.

Moreover, an automatic computation is carried out to obtain the inclination of the rectangle defined by the four reference lines 12 to 15 and the coordinates of the center of the rectangle. The cross lines 17 and 18 (XY coordinates) having the center of the rectangle as the respective origins are produced. The cross lines 17 and 18 are inclined by the same angle as the inclination of the rectangle. Thus, the cross lines 17 and 18 (XY coordinates) having the center of the rectangle (component image 10) as the respective origins can automatically be produced so as to be inclined by the same angle as the inclination of the rectangle. Consequently, the origin of the cross lines 17 and 18 (XY coordinates) need not be positioned and no adjustment of inclination is necessitated.

Furthermore, the component image 10, the first to fourth reference lines 12 to 15 and the cross lines 17 and 18 are turned together on the screen of the display 11 by the angle equal to the inclination of the rectangle, whereby the inclinations of the component image 10, the reference lines 12 to 15 and the cross lines 17 and 18 are rendered zero. Furthermore, the component image 10 is moved toward the center of the screen of the display 11 together with the first to fourth reference lines 12 to 15 and the cross lines 17 and 18 so that the center of the component image 10 automatically corresponds with the center of the screen of the display 11. Consequently, the operator needs only to input the three points A to C on the outline of the component image 10, and the sequential processes from production of the reference lines 12 to 15 and cross lines 17 and 18 to the movement and turn can all be automatized. Consequently, the component image 10 can be positioned on a central part of the screen of the display 11 together with the reference lines 12 to 15 and the cross lines 17 and 18 precisely both horizontal and vertical directions.

Moreover, since the component image 10 is displayed on the central part of the display screen, a larger image can be displayed by an effective use of the screen when the component image 10 is scaled up. Consequently, the component image 10 is easy for the operator to view.

The reference lines 12 to 15 may or may not be displayed and furthermore, the cross lines 17 and 18 may or may not be displayed. When the cross lines 17 and 18 and reference lines 12 to 15 are not displayed, the operator inputs two corners of one side edge of the outline of the component image 10 as the first and second reference points A and B respectively and the point on another side edge of the outline of the component image 10 as the third reference point C. As a result, the size of the outline (the rectangle) and the inclination of the component image 10 are determined from the positions of the three reference points A to C. Accordingly, the size of the outline and the inclination of the component image 10 may automatically be calculated so that the component data is produced. In this case, the component image 10 may be turned so that the inclination of the component image 10 is rendered zero, and the component image 10 may be moved toward the center of the screen of the display 11 so that the center of the component image 10 automatically corresponds with the center of the screen of the display 11.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

This application claims priority from Japanese Patent Application 2004-241829, filed Aug. 23, 2004, which is incorporated herein by reference in its entirety.

What is claimed is:

1. A method of producing component data for use with an electronic component mounting apparatus, comprising:
   a process of imaging a component whose component data is to be produced, by an imaging unit and displaying a component image on a display, the component image on the display having an outline further having at least one side edge with two corners;
   a process of inputting the corners as reference points by an operator so that a first reference line passing the reference points is produced;
   a process of producing second and third reference lines passing the reference points respectively so as to be perpendicular to the first reference line;
   a process of inputting a point on another side edge of the outline of the component image by the operator and producing a fourth reference line passing the point on said another side edge so as to be parallel to the first reference line; and
   a process of producing component data by measuring a size of the outline of the component image on the basis of the first to fourth reference lines and automatically computing a size of the out line of the component image and an inclination of the component image from the reference points.

2. The method according to claim 1, further comprising a process of automatically calculating an inclination of a rectangle defined by the first to fourth reference lines and coordinates of a center of the rectangle and a process of producing a cross line having the center of the rectangle as an origin thereof, the cross line having an inclination equal to the inclination of the rectangle.

3. The method according to claim 2, further comprising a process of turning the component image, the first to fourth reference lines and the cross line together on a screen of the display by an angle equal to the inclination of the rectangle so that the inclinations of the component image, first to fourth reference lines and cross line are rendered zero, and a process of moving the component image toward a center of a screen of the display together with the first to fourth reference lines and the cross line so that a center of the component image corresponds with the center of the screen of the display.

4. A method of producing component data for use with an electronic component mounting apparatus, comprising:
   a process of imaging a component whose component data is to be produced, by an imaging unit and displaying a component image on a display, the component image on the display having an outline further having at least one side edge with two corners; and
   a process of inputting the corners of said one side edge as first and second reference points and an optional point on another side edge of the outline of the component image as a third reference point by an operator measuring a size of the outline of the component image based on reference lines passing the reference points, automatically computing a size of the outline of the component image and an inclination of the component image from the three reference points thereby to produce component data.

5. A device for producing component data for use with an electronic component mounting apparatus, comprising:
   an imaging unit which images a component whose component data is to be produced;
   a display which displays a component image obtained by the imaging unit, the component image on the display having an outline further having at least one side edge with two corners;
   an input unit operated by an operator so that a point on the component image displayed on the display is input; and
   a component data producing unit which produces component data on the basis of the component image, the component data producing unit including a first producing unit which produces a first reference line when the input unit is operated by the operator so that the two corners are input as reference points, the first reference line passing two reference points input by the input unit and corresponding to the side edge corners of the outline of the component image on the display, a second producing unit which produces second and third reference lines passing the reference points respectively so as to be perpendicular to the first reference line, a third producing unit which inputs a point on another side edge of the outline of the component image by operating the input unit by an operator and produces a fourth reference line passing the point on said another side edge so as to be parallel to the first reference line, and a component data producing unit which produces component data by measuring a size of the outline of the component image on the basis of the first to fourth lines and by automatically computing a size of the outline of the component image and an inclination of the component image from the reference points.

6. The device according to claim 5, wherein the component data producing unit further comprises a computing unit which automatically calculates an inclination of a rectangle defined by the first to fourth reference lines and coordinates of a center of the rectangle and another producing unit which produces a cross line having the center of the rectangle as an origin thereof, the cross line having an inclination equal to the inclination of the rectangle.

7. The device according to claim 6, wherein the component data producing unit further comprises a turning unit which turns the component image, the first to fourth reference lines and the cross line together on a screen of the display by an angle equal to the inclination of the rectangle so that the inclinations of the component image, first to fourth reference lines and cross line are rendered zero, and a moving unit which moves the component image toward a center of a screen of the display together with the first to fourth reference lines and the cross line so that a center of the component image corresponds with the center of the screen of the display.

8. A device for producing component data for use with an electronic component mounting apparatus, comprising:

an imaging unit which images a component whose component data is to be produced;

a display which displays a component image obtained by the imaging unit, the component image on the display having an outline further having at least one side edge with two corners;

an input unit operated by an operator so that an optional point on the component image displayed on the display is input; and a component data producing unit which produces component data on the basis of the component image displayed on the display, the component data producing unit including a unit which inputs the corners of said one side edge as first and second reference points and an optional point on another side edge of the outline of the component image as a third reference point when the input unit is operated by the operator, thereby automatically computing a size of the outline of the component image and an inclination of the component image from the three reference points thereby to produce component data and a unit configured to measure a size of the outline of the component image based on reference lines passing through the three reference points.

* * * * *